United States Patent

Iwamoto

[11] 4,150,999
[45] Apr. 24, 1979

[54] METHOD FOR MANUFACTURE OF FERROSILICON NITRIDE

[75] Inventor: Sadayuki Iwamoto, Omuta, Japan

[73] Assignee: Denki Kagaku Kogyo Kabushiki Kaisha, Tokyo, Japan

[21] Appl. No.: 911,420

[22] Filed: Jun. 1, 1978

Related U.S. Application Data

[63] Continuation-in-part of Ser. No. 603,920, Aug. 12, 1975, abandoned, which is a continuation-in-part of Ser. No. 496,832, Aug. 12, 1974, abandoned.

[51] Int. Cl.² .............................................. C04B 35/58
[52] U.S. Cl. .............................. 106/73.5; 75/0.5 BA; 106/55; 106/65; 106/72; 423/264; 423/344
[58] Field of Search ................. 106/73.5, 55; 423/348, 423/344, 340, 324; 75/0.5 BA

[56] References Cited

U.S. PATENT DOCUMENTS

| | | | |
|---|---|---|---|
| 2,881,083 | 4/1959 | Veale | 106/72 |
| 2,937,929 | 5/1960 | Voos | 423/348 |
| 3,084,998 | 4/1963 | Dess | 423/344 |
| 3,206,318 | 9/1965 | Yamauchi et al. | 106/55 |
| 3,684,479 | 8/1972 | Fabo | 75/0.5 BA |
| 4,069,057 | 1/1978 | Kamei et al. | 106/73.5 |

FOREIGN PATENT DOCUMENTS

| | | | |
|---|---|---|---|
| 40-15337 | 7/1965 | Japan | 264/125 |
| 43-7018 | 3/1968 | Japan | 423/344 |
| 44-3210 | 2/1969 | Japan. | |
| 122241 | 6/1971 | Norway | 423/344 |

OTHER PUBLICATIONS

Levine, Sidney–"Temporary Organic Binders for Ceramic Systems"–Ceramic Age 75, Feb. 1960, pp. 25–27, 32–36.
Crandall, W. B. et al.–"Preparation and Evaluation of Si–Al–O–N", ITT Res Inst–Jun. 1973, pp. 8–10.

Primary Examiner—Helen McCarthy
Attorney, Agent, or Firm—Cooper, Dunham, Clark, Griffin & Moran

[57] ABSTRACT

Method for the manufacture of ferrosilicon nitride is disclosed. The method produces ferrosilicon nitride with a silicon nitride content of 65% to 85% by weight by oxidizing the metallic iron which is present in the ferrosilicon nitride in an aqueous medium in the presence of selected oxidizing agents while forcing a mixture of air and steam through the aqueous medium.

2 Claims, 1 Drawing Figure

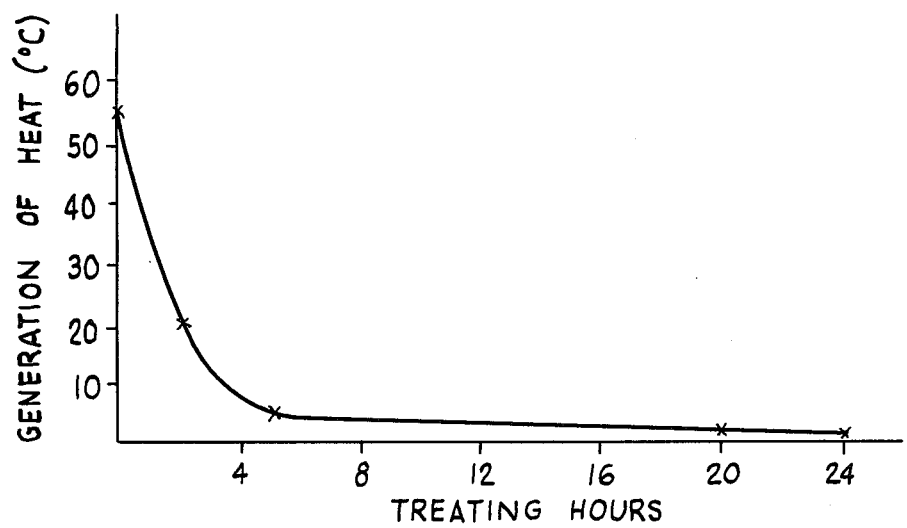

4,150,999

METHOD FOR MANUFACTURE OF FERROSILICON NITRIDE

RELATED APPLICATIONS

This application is a continuation in part of copending application Ser. No. 603,920 filed on Aug. 12, 1975, which is in turn a continuation in part of application Ser. No. 496,832 filed on Aug. 12, 1974, both now abandoned.

BACKGROUND OF INVENTION

Molten iron troughs of the type employed in blast furnace systems generally comprise a refractory substance such as silicon carbide, silicon nitride, carbon, aluminum oxide or silicon oxide which may be blended and compounded with an organic binding agent such as tar or pitch.

Silicon carbide is incorporated as an additional material. This additive serves a variety of useful functions. It accelerates the sintering of the silicon carbide or carbon and thereby retards the formation of pores in the molded trough. Additionally, it extends the useful life of the trough by increasing its strength as well as its resistance to oxidation and corrosion.

Since metallic silicon is expensive, the thus produced silicon nitride is also expensive. The art, therefore, has long sought an acceptable substitute.

One such substitute is ferrosilicon nitride. It is relatively inexpensive. Additionally, the non-nitrogenized ferrosilicon in the product also accelerates the sintering of the trough material. For these reasons, the product has found some acceptance as a substitute for silicon nitride.

The product is not without its disadvantages, however. Tar or pitch which are often used as binders emit offensive odors when exposed to high temperatures. Such replacements as have been proposed have involved the use of volatile organic solvents which are themselves an environmental and health hazzard as well as a potential source of fire or explosions.

In the circumstance the art has sought to replace the organic binders with a combination of water soluble binders and clay both of which are inexpensive and do not adversely affect the environment.

The actual use of clay containing materials, however, meets with certain difficulties.

Ferrosilicon nitride contains a certain amount of impurities including metallic iron. Other characteristic impurities include calcium and aluminum nitrides. These products react with water in the binding agent to produce hydroxides. The reactions deplete the water content of the molded trough in two ways. One is by the reaction itself. The other is by evaporation since the reaction is strongly exothermic. This loss of water results in the production of unsatisfactory molds. The water must be replaced and this has proved to be a source of difficulty. The total amount of impurities is normally up to about 3% by weight and these may include, in addition to those mentioned above, phosphorous, manganese, magnesium and carbon.

Calcium and aluminum nitride are produced during nitrogenization of the starting ferrosilicon which normally contains calcium and aluminum metals as impurities.

The metallic iron causes a similar problem. It is not easily oxidized nitrogenizing metallic silicon at an elevated temperature in nitrogen.

Experience has shown that the problems cannot be solved simply by using an excess of water in the preparation of the troughs or molds. The reason is that the time the refractory compound-clay-binder-water blend will be stored before use varies, and because the optimum amount of water which should be present varies from blend to blend. Accordingly a control which permits the production of uniform troughs with a proper amount of excess water for each trough is difficult to devise.

SUMMARY OF THE INVENTION

The present invention relates to methods for the production of stable ferrosilicon nitride from unstable ferrosilicon nitride, and containing impurities which will react with water. The ferrosilicon nitride produced will normally contain from 65% to 85% silicon nitride.

The process of the invention comprises oxidizing the oxidizable impurities in ferrosilicon nitride in an aqueous medium containing the ferrosilicon nitride with an oxidizing agent while passing a mixture of steam and air through the mix at ambient temperature, that is from about 20° C. to 200° C. The oxidizing agent is one wich is capable of converting metallic iron to ferrous or ferric ions under the condition of the reaction. These include acids such as hydrochloric, sulfuric, nitric, phosphoric, dichromic, chromic, acetic, oxalic, formic, tartaric and citric, and salts such as aluminum phosphate, ferric chloride, ferric sulfate and aluminum sulfate.

The process offers a method for the economical production of commercially useful ferrosilicon nitride utilizing water soluble binding agents and clay.

BRIEF EXPLANATION OF THE DRAWING

The FIGURE is a graph showing the relation between the number of hours of treatment and the generation of heat observed when ferrosilicon nitride was treated with dilute hydrochloric acid.

DETAILED DESCRIPTION OF THE INVENTION

The reactivity of ferrosilicon nitride with water was studied in detail in relation to evolution of heat, change in pH status, change in composition, etc. As a consequence, it has been discovered that unstable components present in minute amounts in ferrosilicon nitride actually participate in the reaction with water and that during this reaction, there is evolution of heat and change of the pH value to above 7.

There is only limited reaction with water at temperatures below 20° C., and reaction tends to occur more readily with increasing temperature. The reactivity with water increases and reaches its peak in about two days from the time of blending and thereafter gradually decreases. The alkalinity continues to increase for about ten days with standing. Once the blend is soaked in water for ten days and thereafter dried, evolution of heat no longer occurs.

As regards the method of pretreatment, a study was also made on such factors as temperature and duration of standing during the soaking of the blend in water.

Ferrosilicon nitride comprises principally silicon nitride ($Si_3N_4$) in a weight proportion of 65 to 85%, impurities containing 1 to 2% by weight of Ca, Al, etc. and residual iron or unreacted ferrosilicon. The component which is principally active as a fire-proofing material is $Si_3N_4$ in which about 10 to 15% is of metallic iron is evenly dispersed in the form of particles. The metal iron as indicated above is easily oxidized and generates a large amount of heat. So, when ferrosilicon nitride to be used as a trough material is blended with the binding agent containing water it generates such heat. If the problem is not dealt with the product dries appreciably and some portions become too hard to be used. The problem can be avoided by oxidizing the metallic iron.

In the method according to the present invention, by adding a dilute solution of selected acids, specially of inorganic acids, to the ferrosilicon nitride, the metal iron present in ferrosilicon nitride is converted into acid compounds such as, for example, iron chloride ($FeCl_2$) and iron sulfate ($Fe_2(SO_4)_2$), and then acid compounds of iron is converted into iron oxide ($Fe_2O_3$) by air oxidization.

In the present invention, there may be used any acidic solution of organic acid such as acetic acid, formic acid, etc. or inorganic acids such as hydrochloric acid, sulfuric acid ($H_2SO_4$), nitric acid, etc., chromic, dichromic. Inorganic acids are more effective than organic acids. An aqueous solution of hydrochloric acid or nitric acid is easy to use and effective.

Concentration of acids to be used should not be so high as to prevent elution of the component of ferrosilicon nitride. The acids work catalytically and should be dilute, more specifically less than 30% by weight. The amount of acid preferably falls in the range of from 1 to 100 parts by weight to 100 parts by weight of ferrosilicon nitride. When the amount is less than 1 part by weight it is impossible to obtain complete oxidation reaction, and when it exceeds 100 parts by weight surplus acid remains and an after-treatment becomes necessary.

Following the addition of acid, the mix is agitated and oxidized with air and steam at a temperature of from 20° C. to 200° C., preferably 50° C. to 150° C. The oxidation with air takes place in the presence of the acid component and is completed in rather a short time for example up to three hours. If hydrochloric acid is used, the $FeCl_3$ is changed to $Fe_2O_3$ by oxidation with air. The ferrosilicon nitride obtained by the present invention comprises $Si_3N_4+Fe_2O_3$ and is an excellent trough material. It can be used with binders such as pulp waste fluids, black strap molasses and phosphoric acid. These latter materials also have some oxidizing ability and are therefore especially useful.

While any amount of oxidizing agent will have some useful effect it is preferred to use at least a stoichiometric quantity based on the amounts of impurity present.

The following non-limiting examples are given by way of illustration only.

EXAMPLE 1

The exothermic temperature of a ferrosilicon nitride powder, 80% of which are of a particle size less than 74μ, was 56.5° C. To 80 Kg of the ferrosilicon nitride powder was added 12 l of dilute hydrochloric acid (1:50) and the mix blended. The blend was heated from the outside by steam, and a mix of air and steam was blown in at a rate to maintain the inside temperature of the vessel at 100° C. A total of 3 Kg/cm² of steam was blown into the vessel, while rotating a circular stirrer at a rate of 6 r.p.m. keeping the relative humidity at 90 to 100%.

As shown in the FIGURE, after 5 hours treatment, the blend was dried to obtain the ferrosilicon nitride having an exothermic temperature of 6.0° C. The amount of chlorine present in ferrosilicon nitride before and after the treatment was 0.05% by weight and 0.10% by weight respectively, indicating that the increase of chlorine was very small.

EXAMPLE 2 to 18

The following Examples were carried out using various additives by the same method as Example 1.

| Example Nos. | Additives Kind | Density | Exothermic temp. after treatment | |
|---|---|---|---|---|
| 2 | sulfuric acid | (1:50) | 7.8° C. | Ferrosilicon nitride which has not been treated has the exothermic temperature of 56.5° C. |
| 3 | nitric acid | " | 12.3 | |
| 4 | phosphoric acid | " | 6.4 | The amount of each additive is 12 l/ batch. |
| 5 | dichromic acid | " | 6.8 | The treated amount of the ferrosilicon nitride powder is 80 Kg/batch. |
| 6 | chromic acid | " | 8.8 | |
| 7 | acetic acid | " | 8.4 | The treating time is 5 hours for Examples 2 to 11 and 24 hours for others. |
| 8 | oxalic acid | (1:50) | 11.6 | |
| 9 | formic acid | " | 10.6 | |
| 10 | tartaric acid | " | 8.4 | |
| 11 | citric acid | " | 7.6 | |
| 12 | molasses | (1:10) | 1.7 | |
| 13 | acidic pulp waste fluid | " | 7.2 | |
| 14 | NaCl | (1:50) | 23.1 | |
| 15 | aluminum | " | 4.3 | |

-continued

| Example Nos. | Additives Kind | Density | Exothermic temp. after treatment |
|---|---|---|---|
| 16 | phosphate ferric chloride | " | 7.6 |
| 17 | ferric sulfate | " | 3.7 |
| 18 | aluminum sulfate | " | 10.5 |

Exothermic temperature, which is a measure of the amount of oxidation taking place is determined by mixing fixed quantities of the ferrosilicon nitride under test with fixed quantities of water soluble binder and holding in a sealed vessel under adiabatic conditions in an atmosphere kept at 24° C. for 24 hours. The exothermic temperature is the difference between 24° C. and the temperature in the vessel.

What is claimed is:

1. A method for treating ferrosilicon nitride having a silicon nitride content of about 65% to 85% by weight, and containing impurities, including iron or unreacted ferrosilicon, which impurities will react exothermically with water, which comprises blending 100 parts by weight of the ferrosilicon nitride powder with an effective amount up to 100 parts by weight of an aqueous medium containing an additive at a concentration up to 30% by weight of the water, said additive being selected from the group consisting of hydrochloric, sulfuric, nitric, phosphoric, dichromic, chromic, acetic, formic, oxalic, tartaric and citric acids; sodium chloride, aluminum phosphate, ferric chloride, ferric sulfate and aluminum sulfate, and forcing a mixture of air and steam through the blend at a rate to maintain the blend temperature at about 50° to 150° C., whereby said impurities are oxidized and the treated ferrosilicon nitride is substantially stablized as to exothermic reaction with water.

2. A process as in claim 1 wherein the additive is selected from the group consisting of hydrochloric, sulfuric, nitric, phosphoric, dichromic and chromic acids.

* * * * *